United States Patent
McLean et al.

(10) Patent No.: US 8,815,059 B2
(45) Date of Patent: Aug. 26, 2014

(54) SYSTEM AND/OR METHOD FOR HEAT TREATING CONDUCTIVE COATINGS USING WAVELENGTH-TUNED INFRARED RADIATION

(75) Inventors: David D. McLean, Hazel Park, MI (US); Richard Blacker, Farmington, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 209 days.

(21) Appl. No.: 12/923,082

(22) Filed: Aug. 31, 2010

(65) Prior Publication Data

US 2012/0048722 A1 Mar. 1, 2012

(51) Int. Cl.
*C23C 14/00* (2006.01)
(52) U.S. Cl.
USPC ........................................ 204/192.1; 438/663
(58) Field of Classification Search
USPC ........................................ 204/192.1; 438/663
See application file for complete search history.

(56) References Cited

U.S. PATENT DOCUMENTS

| | | | |
|---|---|---|---|
| 5,093,207 A | 3/1992 | Hodes et al. |
| 5,344,718 A | 9/1994 | Hartig et al. |
| 5,514,476 A | 5/1996 | Hartig et al. |
| 5,557,462 A | 9/1996 | Hartig et al. |
| 5,584,902 A | 12/1996 | Hartig et al. |
| 5,770,321 A | 6/1998 | Hartig et al. |
| 5,800,933 A | 9/1998 | Hartig et al. |
| 6,042,752 A | 3/2000 | Mitsui |
| 6,059,909 A | 5/2000 | Hartig et al. |
| 6,635,321 B2 | 10/2003 | Wang et al. |
| 6,641,689 B1 | 11/2003 | Aggas |
| 6,686,050 B2 | 2/2004 | Lingle et al. |
| 6,701,749 B2 | 3/2004 | Wang et al. |
| 6,802,943 B2 | 10/2004 | Stachowiak |
| 6,830,817 B2 | 12/2004 | Stachowiak |

(Continued)

FOREIGN PATENT DOCUMENTS

| | | |
|---|---|---|
| EP | 0 634 376 | 1/1995 |
| EP | 0 646 660 | 4/1995 |

(Continued)

OTHER PUBLICATIONS

"Homogeneously Aligned Liquid Crystal Display on Silicon Oxynitride Thin Film Using Ion Beam Bombardment"; Oh et al., Materials Chemistry and Physics 117 (2009) pp. 355-358.

(Continued)

*Primary Examiner* — Keith Hendricks
*Assistant Examiner* — Ibrahime A Abraham
(74) *Attorney, Agent, or Firm* — Nixon & Vanderhye P.C

(57) ABSTRACT

Certain example embodiments relate to systems and/or methods for preferentially and selectively heat treating conductive coatings such as ITO using specifically tuned near infrared-short wave infrared (NIR-SWIR) radiation. In certain example embodiments, the coating is preferentially heated, thereby improving its properties while at the underlying substrate is kept at low temperatures. Such techniques are advantageous for applications on glass and/or other substrates, e.g., where elevated substrate temperatures can lead to stress changes that adversely effect downstream processing (such as, for example, cutting, grinding, etc.) and may sometimes even result in substrate breakage or deformation. Selective heating of the coating may in certain example embodiments be obtained by using IR emitters with peak outputs over spectral wavelengths where the conductive coating (or the conductive layer(s) in the conductive coating) is significantly absorbing but where the substrate has reduced or minimal absorption.

13 Claims, 7 Drawing Sheets

(56) References Cited

U.S. PATENT DOCUMENTS

| | | |
|---|---|---|
| 6,916,408 B2 | 7/2005 | Laird et al. |
| 8,293,344 B2 | 10/2012 | Lemmer et al. |
| 8,304,045 B2 | 11/2012 | Lemmer et al. |
| 8,445,083 B2 | 5/2013 | Lemmer et al. |
| 8,524,337 B2 | 9/2013 | Lemmer et al. |
| 2001/0041252 A1 | 11/2001 | Laird |
| 2002/0031674 A1 | 3/2002 | Laird |
| 2002/0071903 A1* | 6/2002 | Lee et al. .................. 427/126.3 |
| 2003/0142705 A1* | 7/2003 | Hackel et al. .................. 372/22 |
| 2004/0147139 A1* | 7/2004 | Jiang .............................. 438/795 |
| 2004/0197574 A1* | 10/2004 | Stachowiak .................. 428/432 |
| 2005/0041193 A1* | 2/2005 | Lifka et al. .................... 349/153 |
| 2006/0099428 A1 | 5/2006 | Butz et al. |
| 2008/0008829 A1* | 1/2008 | Blacker et al. ................ 427/162 |
| 2009/0075069 A1* | 3/2009 | Myli et al. .................... 428/336 |
| 2009/0229856 A1* | 9/2009 | Fredenberg et al. ....... 174/126.2 |
| 2010/0035030 A1* | 2/2010 | Huang et al. .................. 428/201 |
| 2010/0071810 A1 | 3/2010 | Nadaud et al. |

FOREIGN PATENT DOCUMENTS

| | | |
|---|---|---|
| EP | 0 676 379 | 10/1995 |
| EP | 0 719 876 | 7/1996 |
| GB | 2 031 756 | 4/1980 |
| JP | 07-114841 | 5/1995 |
| WO | WO 95/13189 | 5/1995 |

OTHER PUBLICATIONS

"A Full Description of a Simple and Scalable Fabrication Process for Electrowetting Displays", Zhou et al., Journal of Micromechanics and Microengineering 19, (2009) pp. 1-12.

U.S. Appl. No. 12/662,894, Lemmer et al., filed May 10, 2010.

U.S. Appl. No. 12/659,196, Lemmer et al., filed Feb. 26, 2010.

U.S. Appl. No. 12/457,006, Broadway et al., filed May 28, 2010.

\* cited by examiner

SYSTEM AND/OR METHOD FOR HEAT TREATING CONDUCTIVE COATINGS USING WAVELENGTH-TUNED INFRARED RADIATION

FIELD OF THE INVENTION

Certain example embodiments of this invention relate to systems and/or methods for heat treating conductive coatings using wavelength-tuned infrared (IR) radiation. More particularly, certain example embodiments of this invention relate to systems and/or methods for preferentially and selectively heat treating conductive coatings such as indium tin oxide (ITO) using specifically tuned near infrared-short wave infrared (NIR-SWIR) radiation. In certain example embodiments, the coating will be preferentially heated thereby improving its properties while at the same time keeping the underlying substrate temperatures low.

BACKGROUND AND SUMMARY OF EXAMPLE EMBODIMENTS OF THE INVENTION

Transparent conductive oxide coatings, such as indium tin oxide (ITO), as well as other conductive (e.g., metallic) coatings deposited by magnetron sputtering on unheated substrates are often thermally annealed to improve the functional properties of the material by improving its crystallinity. In the case of ITO, for example, this is done primarily to increase conductivity and to decrease absorption. It will be understood that the term "unheated substrates" are those to which no additional thermal energy is intentionally provided during deposition and include, for example, so-called room temperature depositions. By contrast, however, it is understood that some rise in the temperature of the substrate will occur from physical vapor deposition (PVD) processes such as sputtering.

For the case of coatings on glass and other temperature sensitive substrates, it is often not possible or practical to use radiative, conductive, or convective furnace heating processes commonly used throughout the glass industry for the tempering and/or heat strengthening of glass. In the case of glass, for example, exposures to excessively high temperatures (typically over 600 degrees C.) can lead to significant stress changes in the glass, sometimes even resulting in fracture or deformation. And even at lower temperatures, significant stress changes may occur when exposure times are lengthy. These changes may effectively render the glass unprocessable, e.g., to the point where it can no longer be cut, ground, drilled, or otherwise fabricated into its final physical form.

Conversely, stress changes in the glass are often exploited during tempering and heat strengthening processes, e.g., to improve the mechanical properties of the glass by placing the inner volume of the material under tension and the outer skin under compressive stress. As is known by those skilled in the art, the cost of such processing can be high and sometimes even greater than the cost of the glass itself. Additionally, the glass typically cannot be processed any further following tempering or heat strengthening. Therefore, tempering and heat strengthening processes are typically employed only where required for product functionality and/or safety.

The assignee of the instant application is currently developing a number of products that utilize ITO as a transparent conductive layer. Such products are being developed for use in anticondensation and other applications, e.g., where such low emissivity products are used in residential and/or other applications. When the glass is mounted vertically in these applications, as in the case of a typical window, it is usually not tempered or heat strengthened. Approximately 75-80% of the market by volume falls under this category. Therefore, window manufacturers often are not setup to handle high volume tempering and/or do not wish to bear the additional costs and logistics associated with using tempered glass. Thus, it will be appreciated that delivering an annealed "stock sheet" solution that customers can fabricate into whatever final form they desire would be advantageous to the market adoption of these products. It also will be appreciated that the techniques described herein may be advantageous in other applications where transparent conductive oxide materials are used such as, for example, displays and touch screen products.

In general, it will be appreciated that it would be desirable to provide improved techniques for heat treating coatings in a way that has a reduced impact on the underlying substrate.

Certain example embodiments of this invention relate to a method of making a coated article. A glass substrate is provided. A layer of indium tin oxide is formed, directly or indirectly, on the substrate via physical vapor deposition. The glass substrate with the layer of indium tin oxide thereon is exposed to infrared radiation at a peak emission of 1-2 μm for up to about 108 seconds so as to cause the sheet resistance, emissivity, and absorption to be lower than corresponding values for the as-deposited layer of indium tin oxide. The layer of indium tin oxide is preferentially heated such that the glass substrate does not reach a temperature in excess of about 480 degrees C.

Certain example embodiments of this invention relate to a method of making a coated article. A Glass substrate with a layer of indium tin oxide sputter deposited thereon is provided. The glass substrate with the layer of indium tin oxide thereon is exposed to infrared radiation at a peak emission of 1-2 μm for a time sufficient to cause the sheet resistance, emissivity, and absorption to be lower than corresponding values for the as-deposited layer of indium tin oxide, with the sheet resistance following the exposure to the infrared radiation being substantially the same as the sheet resistance would be if the coated article were heated in a conventional radiant furnace for 3.5 min at 650 degrees C. The layer of indium tin oxide is preferentially heated such that the glass substrate does not reach a temperature in excess of about 425 degrees C.

Certain example embodiments of this invention relate to an infrared heat treatment system configured to heat treat a coated article comprising a glass substrate having a coating physical vapor deposition deposited thereon. An infrared heating element is configured to irradiate infrared radiation at a peak emission of 1-2 μm at the coated article for a predetermined amount of time so as to cause preferential heating of the coating or a portion of the coating such that the glass substrate remains at a temperature below 480 degrees C. without any additional cooling elements. The coating comprises at least one layer of indium tin oxide.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
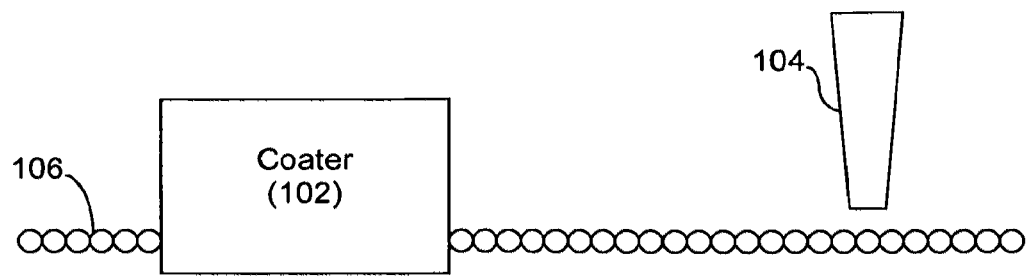
FIG. 1 is a schematic view of a system incorporating an IR heater in accordance with certain example embodiments.

Certain example embodiments relate to techniques for the post-deposition heat treatment of indium tin oxide (ITO) coatings on glass substrates using high-intensity, wavelength-tuned infrared (IR) radiation. The use of particular wavelengths of NIR-SWIR radiation advantageously enables selective heating of the ITO layer while a relatively low substrate temperature is maintained. Additionally, processing times may be reduced over conventional means. This is particularly advantageous for applications on glass and/or other substrates, e.g., where elevated substrate temperatures can lead to stress changes that adversely effect downstream processing (such as, for example, cutting, grinding, etc.) and may sometimes even result in substrate breakage or deformation. Selective heating of the coating may in certain example embodiments be obtained by using IR emitters with peak outputs over spectral wavelengths where ITO is significantly absorbing but where the substrate (e.g., glass) has reduced or minimal absorption. This technique may also be applicable for other transparent conductive coatings including, for example, others types of transparent conductive oxides (TCOs), other metallic (e.g., silver) films, etc.

By preferentially heating the coating using the high-intensity, wavelength-tuned IR radiation techniques described herein, heat treatment of the ITO layer is possible at lower substrate temperatures and/or shorter heating times than would be required by conventional means. Preferential heating is achieved by using IR wavelengths that are absorbed much more strongly by the coating than the substrate. High intensity IR radiation may be supplied, for example, by quartz lamps or laser emitters.

In the case of laser emitters, laser diode arrays may be advantageous, e.g., given their lower cost of ownership compared to other common laser types (and the availability of 940 nm wavelength output matches well with the spectral characteristics of the coating). However, excimer, $CO_2$, YAG, quartz, and/or other types of lasers and/or lamps also may be used in different embodiments. In certain example embodiments, electromagnetic radiation may be focused into a very high aspect ratio rectangular beam spanning the width of the glass. The glass may be traveling on a conveyor in a direction perpendicular to the long axis of the rectangle. In certain example embodiments, a "step and repeat" process may be employed, e.g., so as to irradiate smaller sections in a controlled manner such that the entire substrate ultimately is irradiated. In addition, other sizes and/or shapes may be used including, for example, substantially square shapes, circular shapes, etc.

In general, higher power densities have been found to be preferable because they permit shorter heating times and higher temperature gradients from the coating through the bulk substrate. With shorter heating times, less heat is transferred from the coating through the glass via conduction and a lower temperature may be maintained.

Advantages of the example approaches described herein may include, for instance, increased coating conductivity, reduced coating emissivity, reduced coating absorption, etc. Another advantage of the example approaches described herein may come from the ability to provide such treatments to temperature-sensitive substrates.

FIG. 1 is a schematic view of a system incorporating an IR heater in accordance with certain example embodiments. The FIG. 1 example system includes a coater 102 for physical vapor depositing one or more thin film layers on a substrate, e.g., via sputtering. Downstream of the coater 102 is an IR heater 104. In certain example embodiments, a room temperature sputtering apparatus may be used to deposit ITO on a glass substrate. A conveyor system 106 conveys a substrate through the coater 102, where the layer or layer stack is deposited, and to the IR heater 104. The IR heater 104, in turn, is tuned to focus NIR-SWIR radiation at the substrate with the coating thereon. The wavelength of the IR radiation is selected to as to preferentially heat the coating or a particular layer in the coating, e.g., as compared to the substrate and/or any other layers in a multilayer coating.

Although certain example embodiments have been described as including an IR heater downstream of the coater, it will be appreciated that different example embodiments may locate a coater within a vacuum chamber of the coater. In addition, in certain example embodiments, the IR heat treatment may be performed at any time once the layer to be heat treated or activated has been deposited. For instance, certain example embodiments may perform an IR heat treatment just after ITO layer deposition, whereas certain example embodiments may perform an IR heat treatment once all layers in a layer stack have been deposited. In certain example embodiments, multiple IR heat treatments may be performed at different times during the deposition process.

EXAMPLE

A test was performed using a short-wave infrared (SWIR) furnace incorporating quartz lamps. A peak IR emission wavelength of 1.15 µm was used to heat the coating. This wavelength was determined by analyzing the spectral characteristics of the coating and the glass substrate. The power density of the SWIR furnace is 10.56 kW/ft² (bulb output is 80 W/in, with mounting on 1" centers). Heating times ranged from 12-130 sec with 12 sec intervals. Heating elements were about 4" from the glass surface, although the heating elements may be raised or lowered in different example embodiments of this invention.

Figure 2:
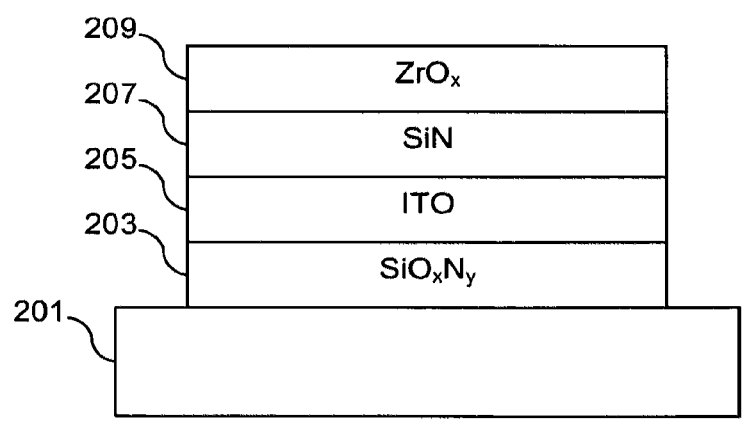
FIG. 2 is an example coating upon which the IR techniques of certain example embodiments were used.

FIG. 2 is an example coating upon which the IR techniques of certain example embodiments were used. FIG. 2 includes a glass substrate 201 supporting a multilayer coating. The multilayer coating comprises an ITO layer 205 sandwiched by two silicon-inclusive layers. The ITO layer 205 in the FIG. 2 example embodiment is 120 nm thick. A first layer 203 comprising $SiO_xN_y$ layer is interposed between the glass substrate 201 and the ITO layer 205, and is 67 nm thick. A second layer 207 comprising SiN is provided, directly or indirectly, on the ITO layer 205. An optional zirconium oxide layer 209 is provided as a top-most layer, e.g., for durability purposes. The glass substrate was 3 mm clear float glass.

Figure 3:
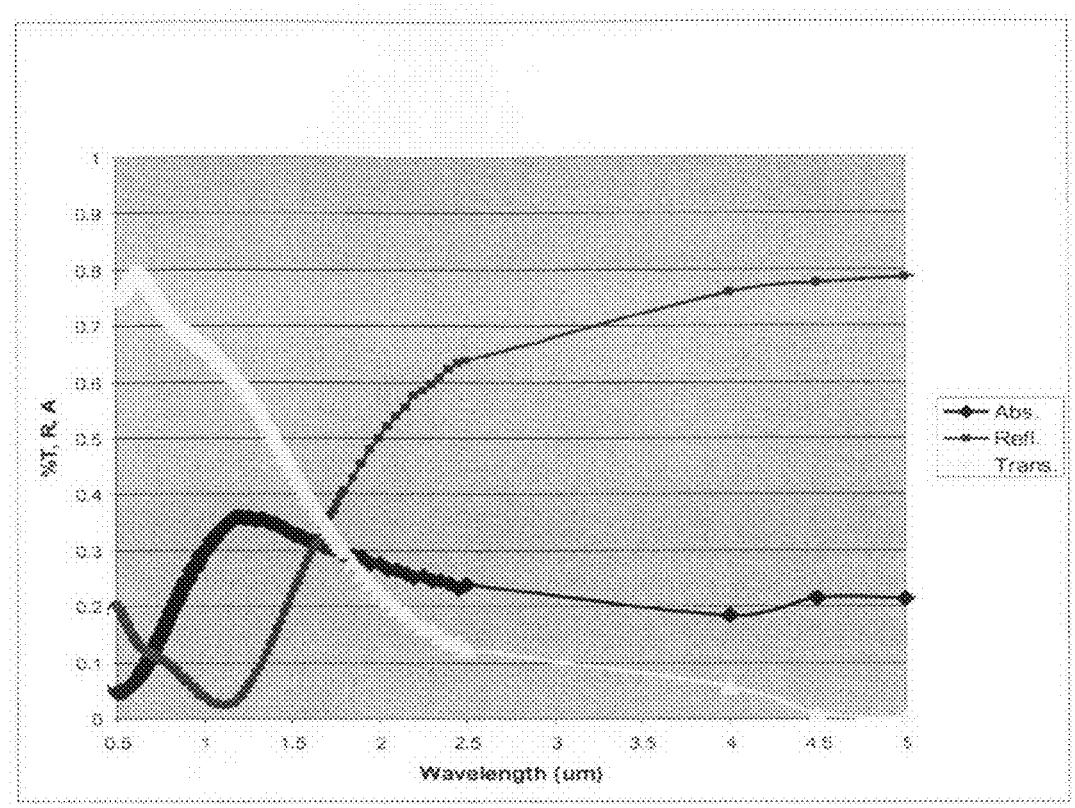
FIG. 3 plots percent transmission, reflection, and absorption against wavelength for a coated sample produced in accordance with an example embodiment.
Figure 4:
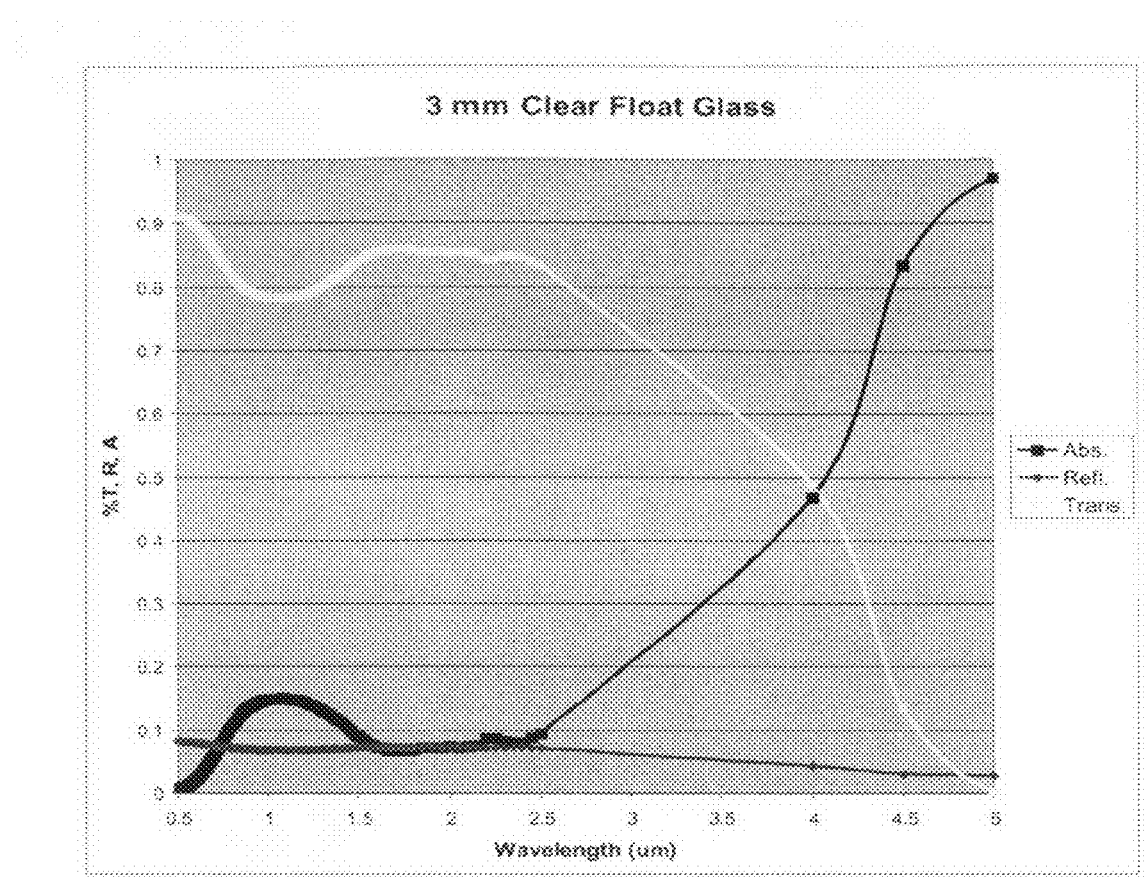
FIG. 4 plots percent transmission, reflection, and absorption against wavelength for an uncoated glass substrate.

Measured spectral data for the coated sample and uncoated glass substrate are presented in FIGS. 3 and 4, respectively. More particularly, FIGS. 3 and 4 plot percent transmission, reflection, and absorption against wavelength for the coated sample and uncoated glass substrate, respectively. FIG. 3 shows the absorption of the glass substrate to be relatively low over the IR spectral range of 0.8-2.5 μm. Low absorption in the glass is desirable to reduce the amount of direct heat transfer to the glass by radiation.

The reflectivity of the ITO containing coating stack has a minimum around 1.1 μm. Reflectivity increases rapidly at increasing wavelengths, leading to a reduction in efficiency of the heating process. At wavelengths longer than 2 μm, the majority of the incoming radiation is reflected by the coated surface.

From these observations, an appropriate wavelength range for heating of 0.8-2.5 μm has been established. More preferably, the IR emission range is 1-2 μm. The above-described techniques may be used to establish optimum or preferred IR emission ranges for heat treating other coatings (e.g., other TCO, metallic, etc. coating) on glass, as well.

By targeting IR wavelengths absorbed by the coating, it is possible to generate a large thermal gradient between the coating and bulk substrate. Because the thermal mass of the coating is very small compared to the glass, the glass essentially acts as a quench mechanism. The rise in bulk glass temperature is mainly attributed to direct heat transfer by IR absorption, rather than by conduction from the coating.

Figure 5:
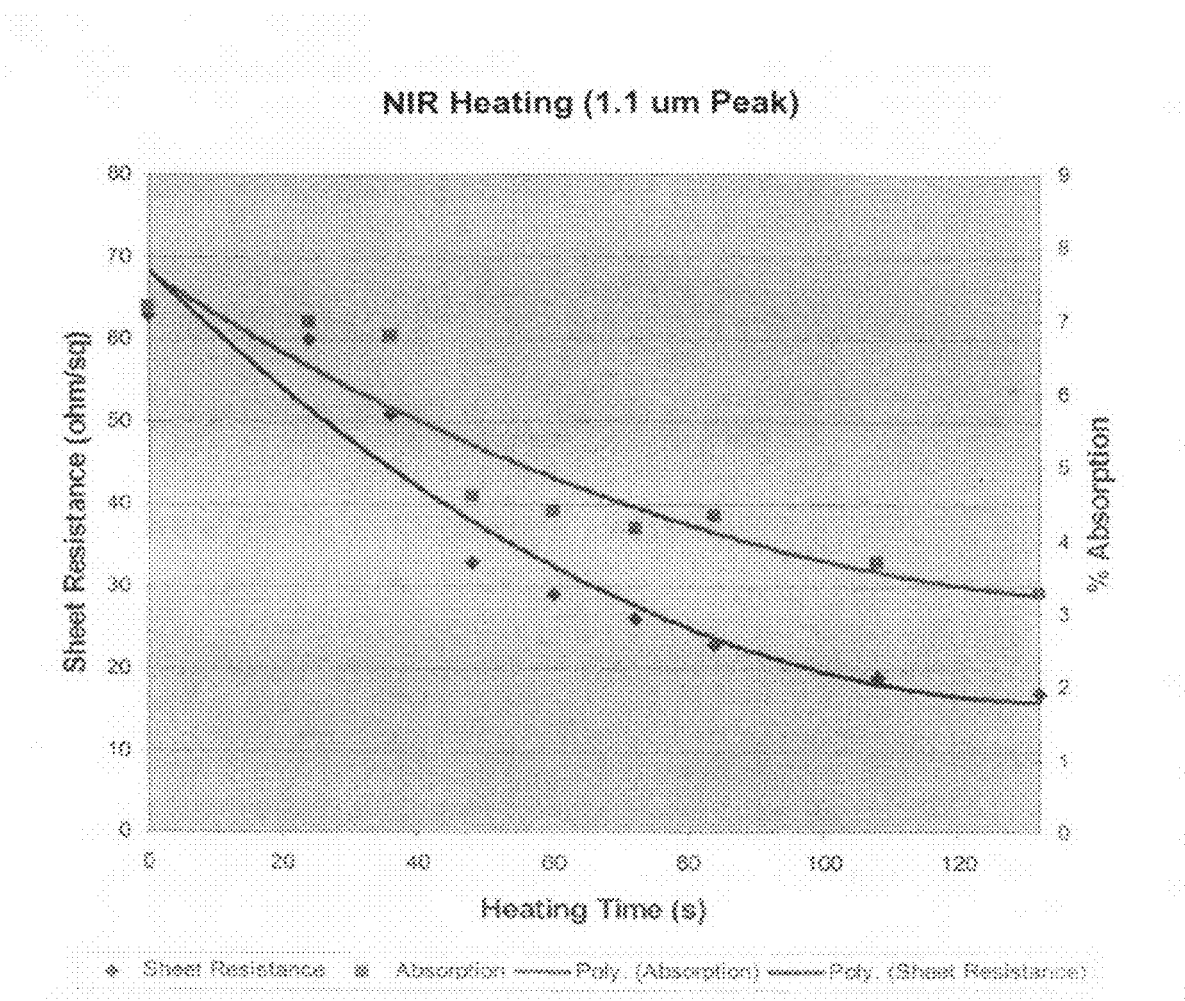
FIG. 5 plots sheet resistance and percent absorption as a function of heating time for certain example embodiments.

FIG. 5 plots the results of the above test. After only 80 sec of heating, the sheet resistance decreased by 70%. After 108 sec, sheet resistance is comparable to samples heated in a conventional radiant furnace for 3.5 min. at 650 degrees C. However, absorption is higher, likely indicating a lower oxidation state compared to the tempered baseline.

After only 48-60 sec of heating, the final crystallinity of the film is obtained. No significant differences in grain size or lattice strain were observed with additional heating.

Figure 6:
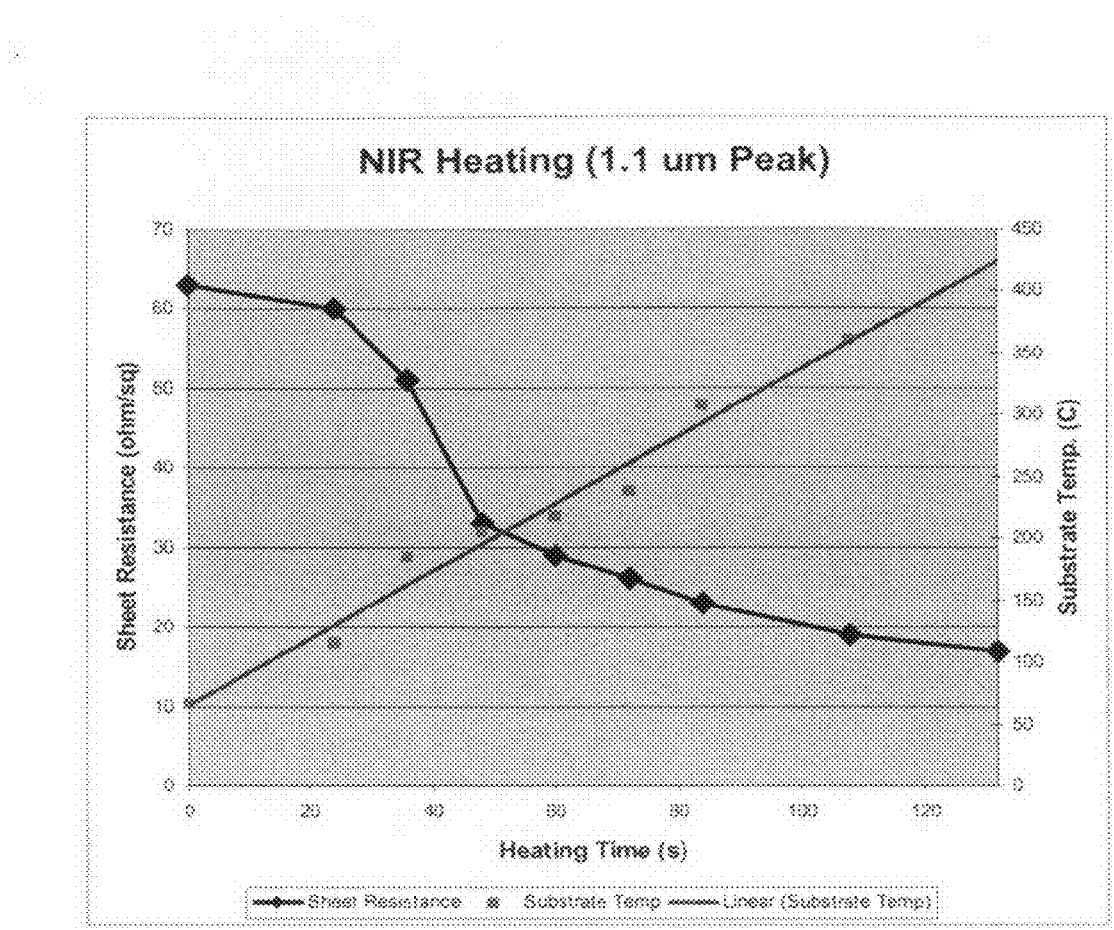
FIG. 6 plots substrate temperature as a function of heating time for certain example embodiments.

Substrate temperature is plotted in FIG. 6 as a function of heating time. Sheet resistance is also plotted for reference. The substrate temperature only reaches 210 degrees C. after 60 sec of heating. It approaches 360 degrees C. after 108 sec of heating when the coating properties become comparable to those of a tempered sample. The substrate temperature is around 300 degrees C. lower in this case.

The initial oxidation level of the ITO on the samples used herein has been optimized for low sheet resistance following tempering (which results in additional oxidation of the ITO). It is likely that a different optimum exists for heat treating ITO using NIR radiation. When the initial oxidation level of the ITO is optimized for NIR heating, it should be possible to significantly reduce the amount of heating required. Theoretically, this time should be reduced to the 48-60 sec required for re-crystallization using the same heating process. Further decreases is heating time may be achieved by optimizing the power density vs. heating time requirements.

Figure 7:
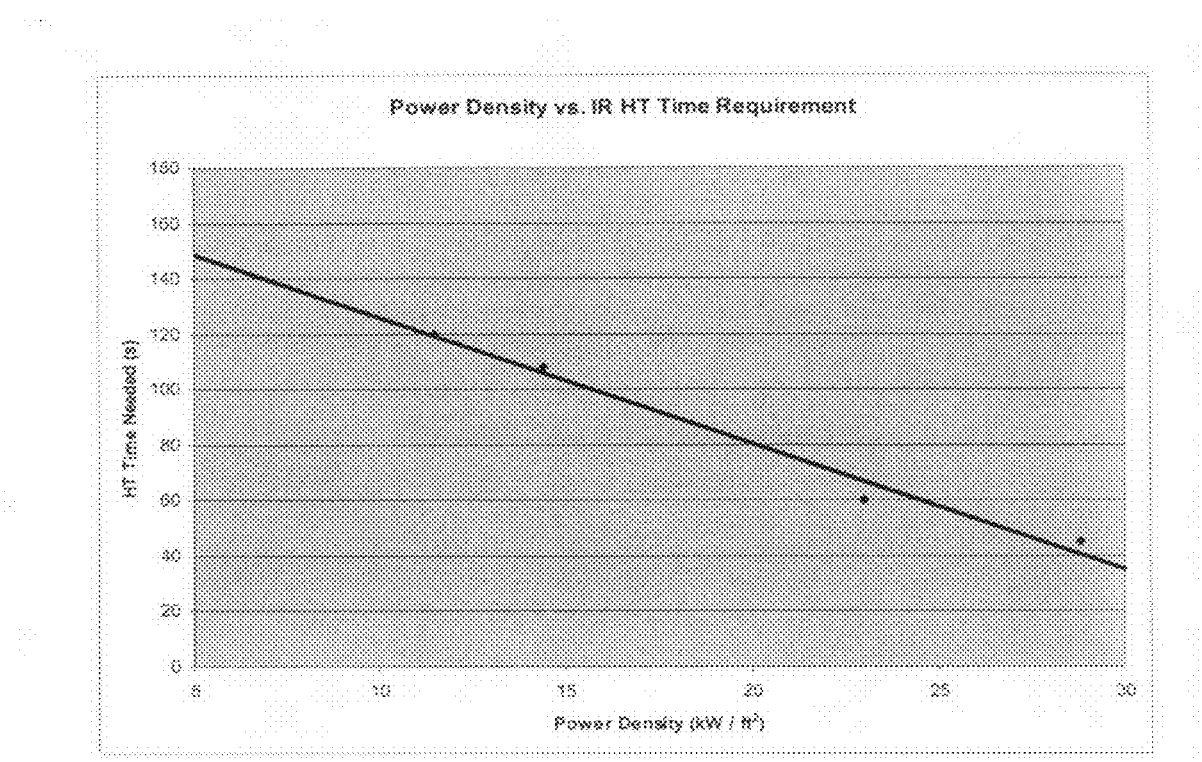
FIG. 7 plots power density vs. IR heat treatment time requirements, e.g., to reach a sheet resistance of 20 ohms/square.

FIG. 7 plots power density vs. IR heat treatment time requirements, e.g., to reach a sheet resistance of 20 ohms/square. Interestingly, in the FIG. 7 graph, the glass temperature was found to be near 400 degrees C., regardless of power density.

Although a certain ITO-based layer stack has been described above, it will be appreciated that the techniques described herein may be used in connection with other ITO-based layer stacks. For instance, the techniques may be applied to a coated article having a coating formed thereon, with the coating comprising an optional first silicon-inclusive layer ranging from about 30-100 nm in thickness (e.g., $SiO_x$, SiN, $SiO_xN_y$, etc.), a layer of ITO ranging from about 70-200 nm in thickness (more preferably about 115 nm in thickness), and a second layer silicon-inclusive layer ranging from about 30-100 nm in thickness (e.g., $SiO_x$, SiN, $SiO_xN_y$, etc.). One or more optional topcoats (e.g., of or including one or more of zirconium oxide, zirconium nitride, aluminum oxide, aluminum nitride, DLC, or the like) also may be provided to improve durability, provide hydrophilic or hydrophilic-like and/or photocatalytic properties (e.g., one or more of anatase $TiO_2$, BiO, BiZr, BiSn, SnO, or the like), etc.

Furthermore, other ITO-based layer stacks also may benefit from the IR heat treatment techniques described herein. See, for example, the embodiments disclosed in application Ser. Nos. 12/662,894 and 12/659,196, the entire contents of which are each hereby incorporated by reference. As one example, the following anticondensation coating may benefit from the IR heat treatment techniques disclosed herein:

|  | Example Thickness Range (nm) | Example Thickness (nm) |
| --- | --- | --- |
| ZrOx | 2-15 | 7 |
| SiNx | 10-50 | 30 |
| ITO | 75-175 | 130 |
| SiOxNy | 10-50 | 35 |
| TiOx | 2-10 | 3.5 |
| SiNx | 10-20 | 13 |

In the above example, ZrOx is the topmost layer, and SiNx is the layer closest the glass substrate.

As indicated above, other TCOs may be used in place of, or in addition to, ITO. For instance, certain example embodiments may incorporate an ITO/Ag/ITO sandwich. Certain example embodiments may incorporate zinc oxide, aluminum-doped zinc oxide (AZO), p-type aluminum oxide, doped or un-doped Ag, FTO, and/or the like. When Ag is incorporated into the layer stack system as a TCO, layers comprising Ni and/or Cr may be provided directly adjacent (contacting) the Ag. In certain example embodiments, each layer in the layer stack system may be sputter-deposited. Also as indicated above, other metallic thin film coatings may take advantage of the techniques described herein.

The NIR heating techniques described herein, furnace heating (at temperatures below the glass transition temperature), and flame treatment (e.g., according to the techniques disclosed in U.S. Publication No. 2008/0008829, the entire contents of which are incorporated herein) were studied, and the results of those techniques were compared to tempered baseline and untreated coatings. Although the optical properties obtained from the various heat treatment methods are different for coatings of similar crystallinity and sheet resistance, this is believed to be caused by a difference in the oxidation of the ITO layer. The table below summarizes these results:

| | Rs | e | Tvis | a* | b* | Rf | a* | b* | A (calc) | Strain (×10⁻³) | Grain size (nm) |
|---|---|---|---|---|---|---|---|---|---|---|---|
| Unheated - as deposited | 63 | .43 | 72.96 | 3.58 | 0.08 | 19.43 | −12.14 | 10.83 | 7.61 | 1.8 | 19.3 |
| Baseline (650° C., 3.5 min) | 20 | .22 | 80.81 | 2.36 | 0.15 | 17.01 | −8.94 | 0.09 | 2.18 | 2.5 | 13.7 |
| Box (300° C., 15 min) | 23 | .23 | 78.06 | 1.12 | −1.54 | 17.12 | −5.78 | 6.57 | 4.82 | 2.4 | 14.2 |
| Box (400° C., 9 min) | 19 | .23 | 79.14 | 1.58 | −0.04 | 17.18 | −6.69 | 0.73 | 3.68 | 2.6 | 13.4 |
| Flame Treatment | 29 | .28 | 77.09 | 1.17 | −2.39 | 17.68 | −6.23 | 10.99 | 5.23 | 2.4 | 14.2 |
| NIR (1.8 min) | 19 | .20 | 79.00 | 1.15 | −1.25 | 17.30 | −5.93 | 4.22 | 3.70 | 2.5 | 13.9 |

As can be seen from the table above, the NIR heating techniques described herein provided the best results in terms of coating properties and the amount of time required for heat treatment. Re-crystallization to a structure comparable to the tempered samples was found to occur with only 48-60 sec. of heating, producing a substrate temperature near 200° C.

Flame treatment was found to cause significant re-crystallization with only two burner passes. However, further improvements were not realized with additional passes under the burner, and the crystalline properties did not quite match those obtained by tempering or NIR heating. It may be possible to achieve similar results with an increase in flame temperature (e.g., acetylene flame) or heat flux (higher combustion gas throughput). However, glass breakage remains a concern with flame heating because the thermal energy is applied very rapidly and only over a small area of the glass, leading to a large temperature gradient across the glass surface in the direction of travel.

Figure 8:
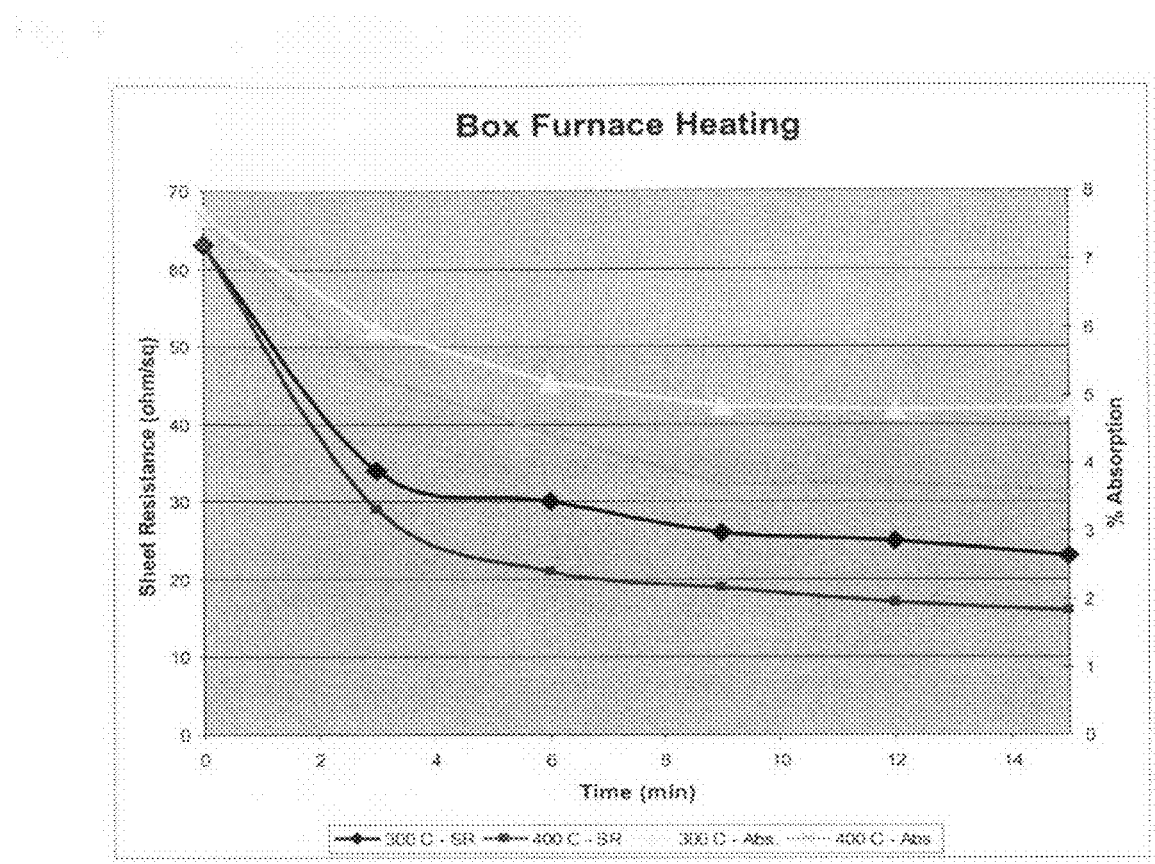
FIG. 8 plots sheet resistance and absorption as a function of time for times and temperatures.

Furnace annealing was found to require much longer exposure times compared to tempering. See, for example, FIG. 8, which shows how the coating changes with furnace annealing at different temperatures and times. More particularly, FIG. 8 plots sheet resistance and absorption as a function of time for times and temperatures. The added costs associated with raising and lowering the furnace temperature along with the long heating times required would lead to significantly higher thermal processing costs than could be achieved by standard tempering. Heat transfer is uniform, and does not specifically target the coating. The data obtained nonetheless provides a useful basis for comparison to other techniques.

The techniques described herein preferably preferentially heat the ITO in the coating such that the glass substrate remains below its transition temperature, which is about 480 degrees C. for float glass. Preferably, the glass substrate remains below 450 degrees C., and more preferably below 425 degrees C. In certain example embodiments, where a peak emission of 1.15 μm is applied for 108 sec, the sheet resistance of the example coating is about one-third of its as-deposited equivalent, and the emissivity and absorption correspondingly drop to about one-half of their as-deposited counterpart values. In the meantime, the substrate temperature reaches a maximum of only about 400 degrees C., which is well below its transition temperature.

NIR generally includes IR having a wavelength of 0.75-1.4 μm, and SWIR generally includes IR having a wavelength of 1.4-3 μm. Certain example embodiments may generally operate within these wavelengths. The substrate temperature preferably does not exceed 480 degrees C., more preferably 450 degrees C., still more preferably 425 degrees C., and sometimes 400 degrees C., as a result of such NIR-SWIR heating.

In certain example embodiments, following heat treatment or activation via the techniques described herein, a coated article may be forwarded to a fabricator or other location, e.g., for further processing such as, for example, cutting, sizing, incorporation into a further article (e.g., a insulating glass unit, skylight, vehicle, glazing, etc.). Preferably, breaking or catastrophic failures of the heat treated coated article will not result as a result of changes to the glass caused by the heat treatment process.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article, the method comprising:
    providing a glass substrate;
    forming a layer comprising indium tin oxide on the substrate via physical vapor deposition, wherein the layer comprising indium tin oxide is located between and directly contacting a first layer comprising silicon nitride and a second layer comprising silicon nitride;
    exposing the glass substrate with the layer comprising indium tin oxide thereon to near infrared radiation at a peak emission of 1-2 μm for up to about 108 seconds so as to cause the sheet resistance, emissivity, and absorption to be lower than corresponding values for the layer comprising indium tin oxide as-deposited;
    wherein the layer of indium tin oxide is preferentially heated such that the glass substrate does not reach a temperature in excess of about 480 degrees C., wherein said preferential heating is due to the layer comprising indium tin oxide being more absorbent to the peak emission than the glass substrate; and
    wherein the first layer comprising silicon nitride further comprises oxygen, and wherein the first and second layers comprising silicon nitride are formed prior to the exposure to the near infrared radiation at a peak emission of 1-2 μm.

2. The method of claim 1, wherein the layer comprising indium tin oxide is formed by sputtering.

3. The method of claim 2, wherein the sputtering is room temperature sputtering.

4. The method of claim 2, wherein the exposure to the near infrared radiation at a peak emission of 1-2 μm is performed in a vacuum chamber.

5. The method of claim 1, wherein the exposure to the near infrared radiation at a peak emission of 1-2 μm is performed downstream of a coater used to form the layer comprising indium tin oxide on the substrate.

6. The method of claim 1, further comprising disposing a ZrOx-based layer, directly or indirectly, on the substrate prior to the exposure to the near infrared radiation at a peak emission of 1-2 μm.

7. The method of claim 1, wherein the peak emission is 1.15 μm.

8. The method of claim 1, wherein following the exposure to the near infrared radiation at a peak emission of 1-2 μm, the sheet resistance of the layer comprising indium tin oxide is reduced by one-third and the emissivity and absorption are reduced by one-half.

9. A method of making a coated article, the method comprising:
   providing a glass substrate;
   forming a layer comprising indium tin oxide, directly or indirectly, on the substrate via physical vapor deposition;
   exposing the glass substrate with the layer comprising indium tin oxide thereon to near infrared radiation at a peak emission of 1-2 μm for up to about 108 seconds so as to cause the sheet resistance, emissivity, and absorption to be lower than corresponding values for the layer comprising indium tin oxide as-deposited;
   wherein the layer of indium tin oxide is preferentially heated such that the glass substrate does not reach a temperature in excess of about 480 degrees C., wherein said preferential heating is due to the layer comprising indium tin oxide being more absorbent to the peak emission than the glass substrate;
   disposing between the layer comprising indium tin oxide and the glass substrate layers comprising a layer comprising $TiO_x$ sandwiched by a first layer comprising silicon nitride and a second layer comprising silicon nitride;
   disposing, directly or indirectly, on the layer comprising indium tin oxide, a third layer comprising silicon nitride; and
   disposing, directly or indirectly, on the third layer comprising silicon nitride, a ZrOx-based layer,
   wherein all layers are disposed on the substrate prior to the exposure to the near infrared radiation at a peak emission of 1-2 μm.

10. The method of claim 9, wherein the layer comprising indium tin oxide is formed by sputtering.

11. The method of claim 10, wherein the sputtering is room temperature sputtering.

12. The method of claim 9, wherein the exposure to the near infrared radiation at a peak emission of 1-2 μm is performed in a vacuum chamber.

13. The method of claim 9, wherein the exposure to the near infrared radiation at a peak emission of 1-2 μm is performed downstream of a coater used to form the layer comprising indium tin oxide on the substrate.

* * * * *